US012811180B2

(12) United States Patent
Obayashi

(10) Patent No.: US 12,811,180 B2
(45) Date of Patent: Nov. 24, 2026

(54) METHOD FOR PRODUCING POWER STORAGE DEVICE AND POWER STORAGE DEVICE

(71) Applicant: TOYOTA JIDOSHA KABUSHIKI KAISHA, Toyota (JP)

(72) Inventor: Yoshiro Obayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 514 days.

(21) Appl. No.: 18/503,833

(22) Filed: Nov. 7, 2023

(65) Prior Publication Data

US 2024/0162475 A1 May 16, 2024

(30) Foreign Application Priority Data

Nov. 15, 2022 (JP) ................................ 2022-182663

(51) Int. Cl.
*H01M 10/04* (2006.01)
*H01M 50/121* (2021.01)
*H01M 50/184* (2021.01)
*H01M 50/193* (2021.01)

(52) U.S. Cl.
CPC ....... *H01M 10/049* (2013.01); *H01M 50/121* (2021.01); *H01M 50/184* (2021.01); *H01M 50/193* (2021.01)

(58) Field of Classification Search
CPC ........... H01M 10/049; H01M 10/0418; H01M 50/121; H01M 50/184; H01M 50/193; H01M 50/0418; H01M 50/0525; H01M 50/183; H01M 50/186; H01M 50/103; H01M 50/627; B29C 45/14008; B29C 45/14639; B29C 45/14459
See application file for complete search history.

(56) References Cited

U.S. PATENT DOCUMENTS

2018/0205118 A1* 7/2018 Chu .................... H01M 50/434
2021/0091435 A1* 3/2021 Muraki ............... H01M 50/197

FOREIGN PATENT DOCUMENTS

JP 2019-016459 A 1/2019
JP 2020-47568 A 3/2020
JP 2020-140860 A 9/2020
JP 2020140862 A * 9/2020
JP 2020161289 A * 10/2020

OTHER PUBLICATIONS

JP-2020140862-A English machine translation (Year: 2020).*
JP-2020161289-A English machine translation (Year: 2020).*

* cited by examiner

*Primary Examiner* — Andrew J Golden
(74) *Attorney, Agent, or Firm* — Sughrue Mion, PLLC

(57) ABSTRACT

A main object of the present disclosure is to provide a method for producing a power storage device wherein a molding failure hardly occurs when molding a resin member. The present disclosure achieves the object by providing a method for producing a power storage device, the method comprising: a preparing step of preparing a predetermined stacked member; a first placing step of placing a predetermined first mold; a first molding step of obtaining a predetermined nest B; a second placing step of placing a predetermined second mold; and a second molding step of molding a predetermined resin member.

11 Claims, 9 Drawing Sheets

METHOD FOR PRODUCING POWER STORAGE DEVICE AND POWER STORAGE DEVICE

TECHNICAL FIELD

The present disclosure relates to a method for producing a power storage device and a power storage device.

BACKGROUND ART

In a method for producing a power storage device such as a secondary battery, the technology wherein a sealing member is formed along the outer periphery of the electrode stacked body, and further, a resin member is formed along the outer periphery of the sealing member, has been known. Also, a technology wherein a through hole passing through a sealing member and a resin member is formed using a nest (insert), has been known.

For example, Patent Literature 1 discloses a power storage device comprising a stacked body including a bipolar electrode; a first sealing portion placed along the outer periphery of the stacked body; a second sealing portion placed along the outer periphery of the first sealing portion; and a through hole passing through the first sealing portion and second sealing portion. Also, Patent Literature 1 discloses the formation of the second sealing portion by preparing a stacked member (a member including the stacked body and first sealing portion) incorporated with a nest, and then, injection molding.

CITATION LIST

Patent Literature

Patent Literature 1: Japanese Patent Application Laid-Open (JP-A) No. 2019-16459

SUMMARY OF DISCLOSURE

Technical Problem

When a resin member is molded on the stacked member incorporated with a nest by a resin molding method, the nest is inserted into a concave portion of the mold, and held and fixed therein. When the nest is inserted into the concave portion of the mold, if the nest and the concave portion of the mold interfere with each other, the nest may be broken. Therefore, it is necessary to set the dimensions of the concave portion of the mold larger to an extent than the dimensions of the nest. Meanwhile, when the dimensions of the concave portion of the mold are too large with respect to the dimensions of the nest, the resin may leak through the gap during molding, and may cause a burr.

Also, the influence of the nest displacement is noticeably large in the width direction (y-axis direction). Therefore, in the width direction, it is necessary to set the dimensions of the concave portion of the mold relatively larger than the dimensions of the nest. As a result, a molding failure such as burr is more likely to occur notably.

The present disclosure has been made in view of the above circumstances, and a main object of the present disclosure is to provide a method for producing a power storage device wherein a molding failure hardly occurs when molding a resin member.

Solution to Problem

[1]

A method for producing a power storage device, the method comprising:

a preparing step of preparing a stacked member including an electrode stacked body including a plurality of electrodes stacked in a z-axis direction, a sealing member placed along an outer periphery of the electrode stacked body viewed from the z-axis direction, and a nest A wherein, in an x-axis direction perpendicular to the z-axis direction, one end portion is placed inside the electrode stacked body and the other end portion sticks out from the sealing member;

a first placing step of inserting the nest A sticking out from the sealing member in the stacked member, into a first concave portion in a first mold;

after the first placing step, a first molding step of molding a resin portion by feeding a first resin between the nest A and the first concave portion, and obtaining a nest B including the nest A and the resin portion;

after the first molding step, a second placing step of inserting the nest B sticking out from the sealing member in the stacked member, into a second concave portion in a second mold; and after the second placing step, a second molding step of molding a resin member by feeding a second resin between the stacked member and the second mold; and a length of the first concave portion in a y-axis direction perpendicular to the z-axis direction and the x-axis direction is identical to that of the second concave portion.

[2]

The method for producing a power storage device according to [1], wherein, viewed from the z-axis direction, the nest B includes the resin portion on both sides of the nest A in the y-axis direction.

[3]

The method for producing a power storage device according to [1] or [2], wherein, viewed from the y-axis direction, the nest B includes the resin portion on both sides of the nest A in the z-axis direction.

[4]

The method for producing a power storage device according to any one of [1] to [3], wherein a melting point of the first resin is higher than the melting point of the second resin.

[5]

The method for producing a power storage device according to any one of [1] to [4], wherein the sealing member is a resin member including a third resin;

the third resin and the second resin are olefin based resin; and the first resin is polyester based resin.

[6]

The method for producing a power storage device according to any one of [1] to [5], wherein, after the second molding step, the method for producing comprises a through hole forming step of forming a first through hole passing through the sealing member and a second through hole passing through the resin member, by pulling the nest B out from the stacked member and the resin member.

[7]

A power storage device comprising: an electrode stacked body including a plurality of electrodes stacked in a z-axis direction; a sealing member placed along an outer periphery of the electrode stacked body viewed from the z-axis direction; and a resin member placed along an outer periphery of the sealing member viewed from the z-axis direction; and in an x-axis direction perpendicular to the z-axis direction, the power storage device comprises a first through hole passing through the sealing member, and a second through hole communicated with the first through hole and passing through the resin member; and when a direction perpendicular to the x-axis direction and the z-axis direction is regarded as a y-axis direction, a length of the second through hole in the y-axis direction is longer than a length of the first though hole in the y-axis direction.

[8]

The power storage device according to [7], wherein a length of the second through hole in the z-axis direction is longer than a length of the first though hole in the z-axis direction.

[9]

The power storage device according to [7] or [8], wherein a residual component of a first resin, having a melting point higher than a second resin included in the resin member, exists in an inner wall portion in the second through hole.

Advantageous Effects of Disclosure

The method for producing a power storage device in the present disclosure exhibits effects that a molding failure hardly occurs when molding a resin member.

DESCRIPTION OF EMBODIMENTS

The embodiments in the present disclosure will be hereinafter explained in details with reference to drawings. Each drawing described as below is a schematic view, and the size and the shape of each portion are appropriately exaggerated in order to be understood easily. Furthermore, in the present description, upon expressing an embodiment of arranging one member with respect to the other member, when it is expressed simply "on" or "below", both of when the other member is directly arranged on or below the one member so as to contact with each other, and when the other member is arranged above or below the one member interposing an additional member, can be included unless otherwise described.

A. Method for Producing Power Storage Device

Figure 1A:
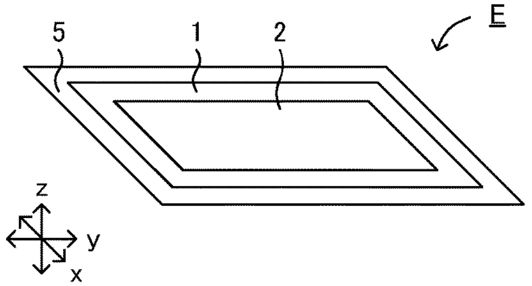
FIGS. 1A to 1H are schematic perspective views illustrating an example of a method for producing a power storage device in the present disclosure.
Figure 1B:
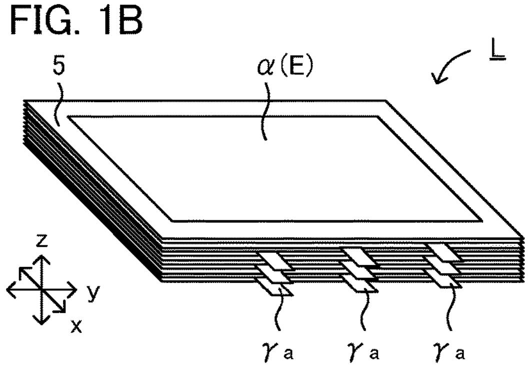
Figure 1C:
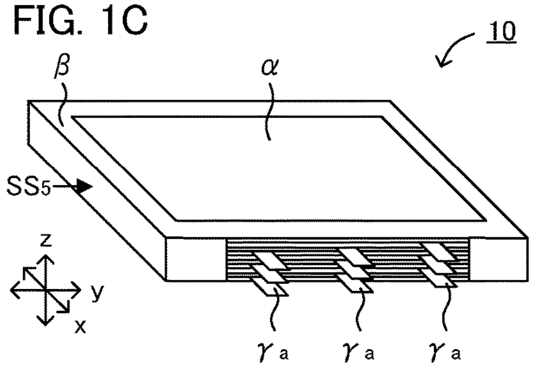

FIGS. 1A to 1H are schematic perspective views illustrating an example of a method for producing a power storage device in the present disclosure. Firstly, as shown in FIGS. 1A to 1C, a stacked member 10 is prepared (preparing step). The stacked member 10 is obtained, for example, by the following method. As shown in FIG. 1A, an electrode E is prepared. The electrode E includes a current collector 1, a cathode layer 2 placed on one surface of the current collector 1, and an anode layer (not shown in the figure) placed on the other surface of the current collector 1. Also, the electrode E includes a frame member 5 for forming a sealing member, along the outer periphery of the current collector 1. Then, as shown in FIG. 1B, a plurality of electrodes E are stacked in the z-axis direction to form an electrode stacked body α. Also, when stacking the plurality of electrodes E in the z-axis direction, a nest A (nest $\gamma_a$) is inserted between plurality of adjacent electrodes E. Then, as shown in FIG. 1C, by heating the side surface of $SS_5$ of the frame member 5 stacked in the z-axis direction, the frame member 5 stacked in the z-axis direction is heat sealed. Thereby, as shown in FIG. 1C, a stacked member 10 including an electrode stacked body α, a sealing member β placed along the outer periphery of the electrode stacked body α viewed from the z-axis direction, and a nest A (nest $\gamma_a$), is obtained.

Figure 1D:
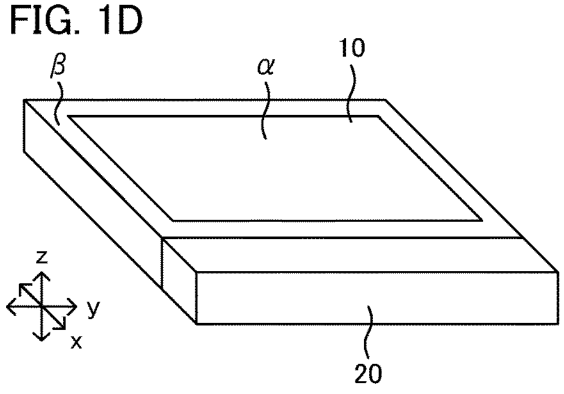
Figure 1E:
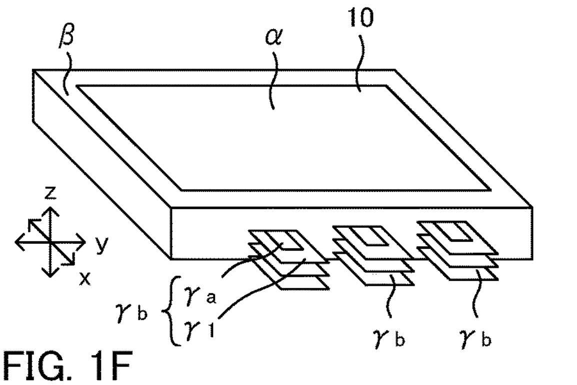

Then, as shown in FIG. 1D, the nest A (not shown in the figure) sticking out from the sealing member β in the stacked member 10, is inserted into a first concave portion (not shown in the figure) in a first mold 20 (first placing step). In the present disclosure, a concave portion is a space to which a nest is inserted, and the concave portion may be a groove with a bottom, and may be a hole portion without a bottom. Then, a resin portion is molded by feeding a first resin between the nest A and the first concave portion. Thereby, as shown in FIG. 1E, a nest B (nest $\gamma_b$) including the nest A (nest $\gamma_a$) and the resin portion $\gamma_1$, is obtained (first molding step).

Figure 2A:
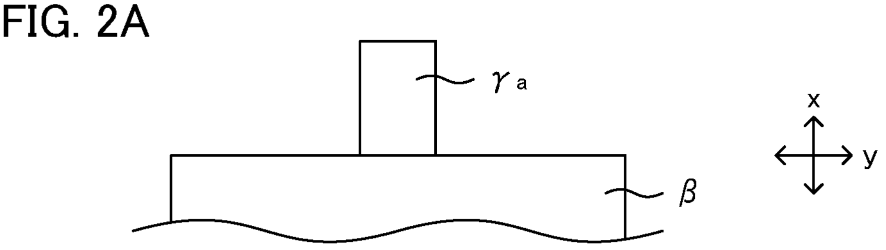
FIGS. 2A to 2D are schematic views illustrating an example of the first placing step and the first molding step in the present disclosure.
Figure 2B:
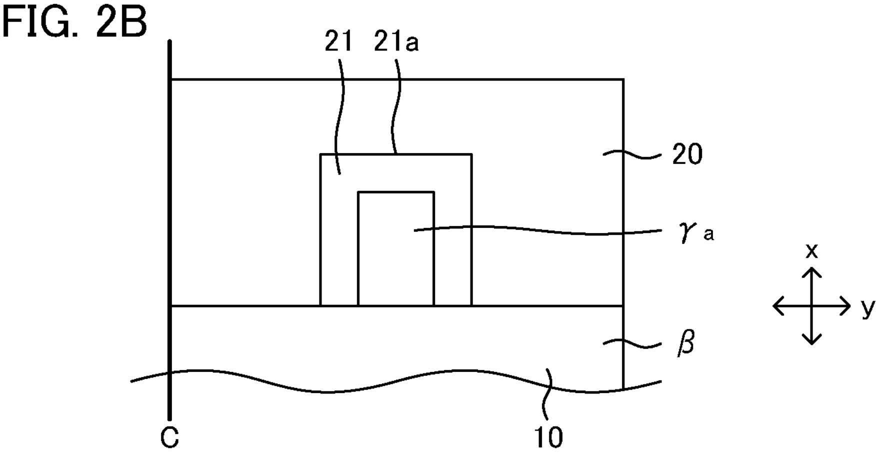
Figure 2C:
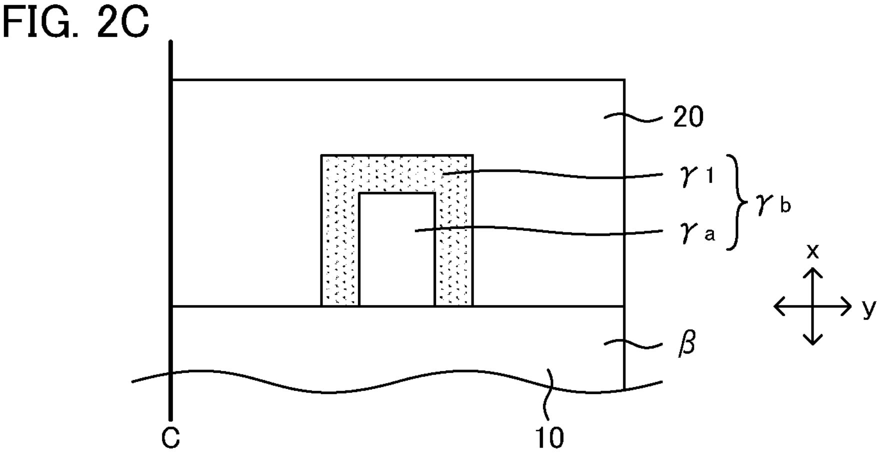
Figure 2D:
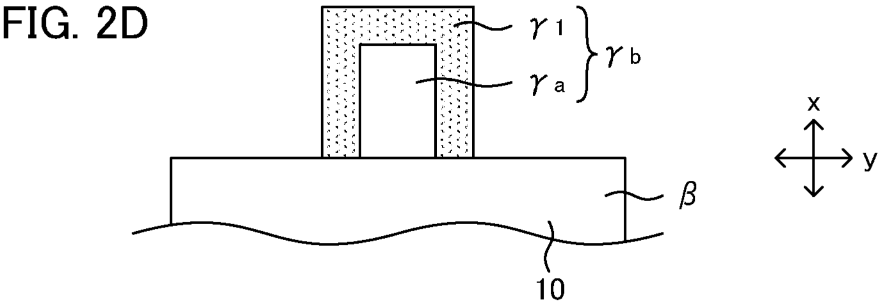

Here, the details of the first placing step and the first molding step are explained referring to FIGS. 2A to 2D. In the first placing step, as shown in FIGS. 2A and 2B, the nest A (nest $\gamma_a$) sticking out from the sealing member β is inserted into the first concave portion 21 of the first mold 20. For example, aligning the end surface of first mold 20 with reference surface C, the position of first concave portion 21 with respect to the nest A (nest $\gamma_a$) is adjusted. Then, as shown in FIGS. 2C and 2D, the nest B (nest $\gamma_b$) is obtained by inflating the nest A (nest $\gamma_a$) with resin portion $\gamma_a$. In the nest B (nest $\gamma_b$), the resin portion $\gamma_a$ may absorb the influence of the misalignment of the nest A (nest $\gamma_a$).

Figure 1F:
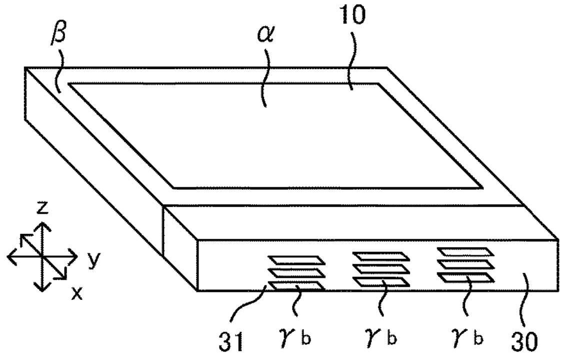
Figure 1G:
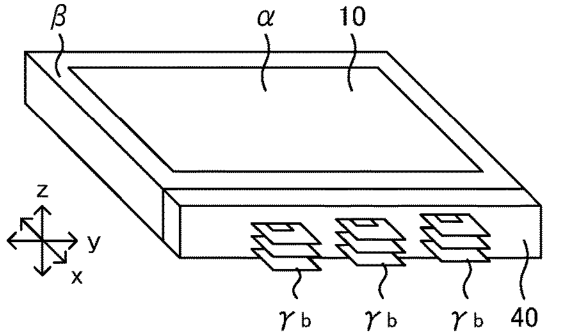

Then, as shown in FIG. 1F, the nest B (nest $\gamma_b$) sticking out from the sealing member β in the stacked member 10, is inserted into a second concave portion 31 in the second mold 30 (second placing step). Then, a second resin is fed between the stacked member 10 and the second mold 30. Thereby, as shown in FIG. 1G, resin member 40 is molded on the stacked member 10 side surface (second molding step).

Figure 3A:
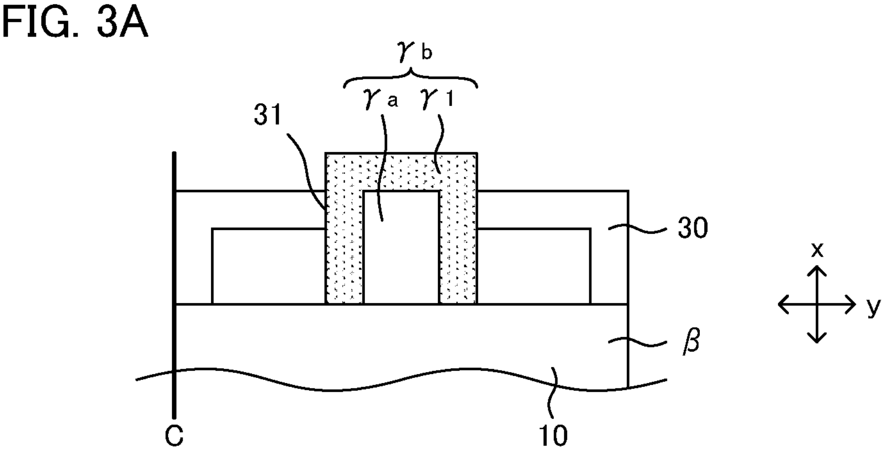
FIGS. 3A to 3C are schematic views illustrating an example of the second placing step and the second molding step in the present disclosure.
Figure 3B:
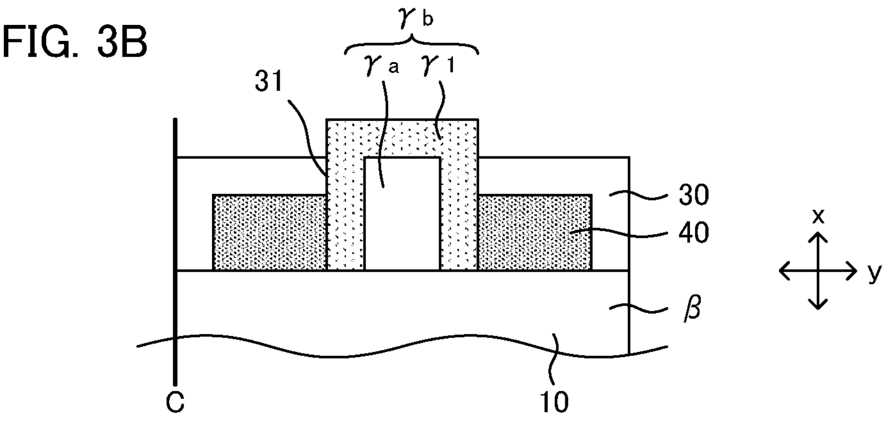
Figure 3C:
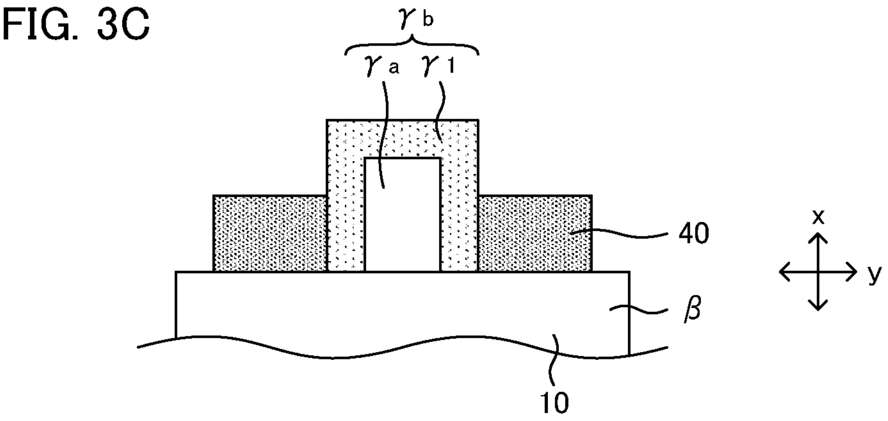

Here, the details of the second placing step and the second molding step are explained referring to FIGS. 3A to 3C. As shown in FIGS. 3A and 3B, the nest B (nest $\gamma_b$) sticking out from the sealing member β is inserted into the second concave portion 31 of the second mold 30. In the present disclosure, the first concave portion (for example, the first concave portion 21 in FIG. 2B) and the second concave portion 31 have the identical length in the y-axis direction. Further, as shown in FIG. 3B for example, aligning the end surface of the second mold 30 with reference surface C, the position of second concave portion 31 with respect to the nest B (nest $\gamma_b$) is adjusted, similarly to the position of first concave portion 21 with respect to the nest A (nest $\gamma_a$). Thereby, as shown in FIG. 3B, a high-precision positioning of the nest B (nest $\gamma_b$) and the second concave portion 31 of the second mold 30 is possible. As a result, the resin may be prevented from being leaked into the gap between the nest B (nest $\gamma_b$) and the second mold 30, so that a desired resin member 40 is molded, as shown in FIG. 3C.

According to the present disclosure, by producing the nest B from the nest A using the first mold, and further molding the resin member using the second mold including the second concave portion whose length in the y-axis direction is identical to that of the first concave portion, a molding failure is suppressed from occurring, when molding a resin member.

Figure 4A:
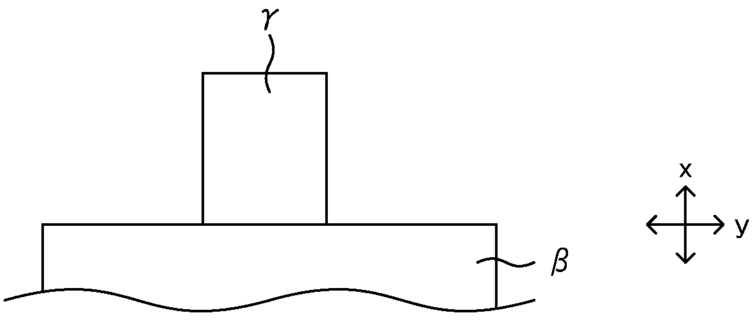
FIGS. 4A to 4C are schematic views illustrating an example of a conventional resin molding method.
Figure 4B:
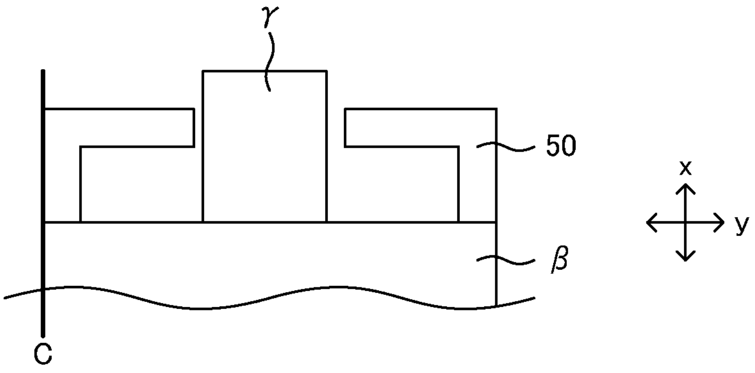
Figure 4C:
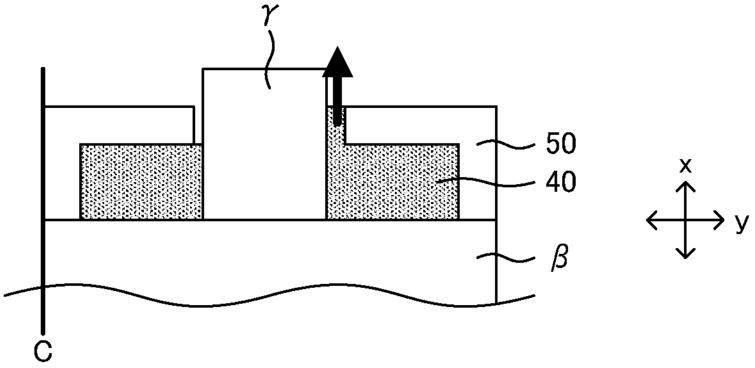

FIGS. 4A to 4C are schematic views illustrating an example of a conventional resin molding method. As shown in FIGS. 4A and 4B, the concave portion of the mold 50 is fit around the nest γ sticking out from the sealing member β. As described above, when the nest γ is inserted into the concave portion of the mold 50, if the nest γ and the concave portion of the mold 50 interfere with each other, the nest γ may be broken. Therefore, it is necessary to set the dimensions of the concave portion of the mold 50 larger to an extent than the dimensions of the nest γ. Meanwhile, when the dimensions of the concave portion of the mold 50 are too large with respect to the dimensions of the nest γ, the resin may leak through the gap during molding, and may cause a burr.

In general, the width of the nest (length in the y-axis direction) is extremely long compared to the thickness of the nest (length in the z-axis direction). Therefore, the influence of the nest displacement is noticeably large in the width direction (y-axis direction). Therefore, in the width direction, it is necessary to set the dimensions of the concave portion of the mold relatively longer than the dimensions of the nest. As a result, a molding failure such as burr is more likely to occur notably. Specifically, as shown in FIG. 4C, the resin leaks into the gap between the nest γ and the concave portion of the mold 50, and a molding failure such as burr is more likely to occur notably.

In contrast, in the present disclosure, as shown in FIGS. 2A to 2D and FIGS. 3A to 3C described above, by producing the nest B from the nest A using the first mold, and further molding the resin member using the second mold including the second concave portion whose length in the y-axis direction is identical to that of the first concave portion, a molding failure may be suppressed from occurring, when molding a resin member.

1. Preparing Step

The preparing step in the present disclosure is a step of preparing a stacked member including an electrode stacked body including a plurality of electrodes stacked in a z-axis direction, a sealing member placed along an outer periphery of the electrode stacked body viewed from the z-axis direction, and a nest A wherein, in an x-axis direction perpendicular to the z-axis direction, one end portion is placed inside the electrode stacked body and the other end portion sticks out from the sealing member.

(1) Electrode Stacked Body

Figure 5:
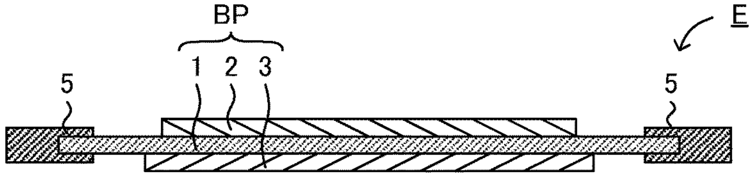
FIG. 5 is a schematic cross-sectional view illustrating an example of an electrode in the present disclosure.

The electrode stacked body in the present disclosure includes a plurality of electrodes stacked in a z-axis direction. The electrode includes a current collector, an electrode layer (a cathode layer or an anode layer) placed on at least one surface of the current collector. As shown in FIG. 5, the electrode E may be a bipolar electrode including a current collector 1, a cathode layer 2 placed on one surface of the current collector 1, and an anode layer 3 placed on the other surface of the current collector 1.

Figure 6:
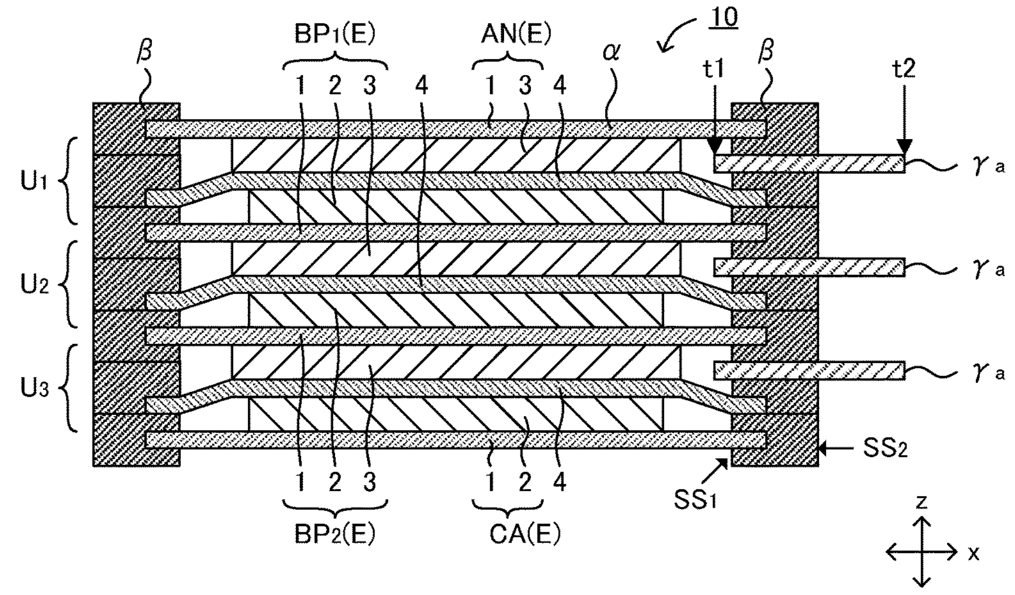
FIG. 6 is a schematic cross-sectional view illustrating an example of a stacked member in the present disclosure.

As shown in FIG. 6, the electrode stacked body α includes a plurality of electrodes E stacked in the z-axis direction (thick direction). As the electrode E, the electrode stacked body a shown in FIG. 6 includes a bipolar electrode $BP_1$, a bipolar electrode $BP_2$, a cathode side end portion electrode CA, and an anode side end portion electrode AN. The bipolar electrode $BP_1$, and the bipolar electrode BP 2 respectively includes a current collector 1, a cathode layer 2 placed on one surface of the current collector 1, and an anode layer 3 placed on the other surface of the current collector 1. The cathode side end portion electrode CA includes a current collector 1, and a cathode layer 2 placed on one surface of the current collector 1. The anode side end portion electrode AN includes a current collector 1, and an anode layer 3 placed on one surface of the current collector 1. Also, the electrode stacked body in the present disclosure is not particularly limited as long as it includes a plurality of electrodes E stacked in the z-axis direction, and it may not include a bipolar electrode.

As shown in FIG. 6, the electrode stacked body α is provided with power generating units U ($U_1$ to $U_3$). The power generating unit U includes a cathode layer 2, an anode layer 3, and a separator 4 placed between the cathode layer 2 and the anode layer 3. After the through hole H illustrated in FIG. 1H described above is formed, liquid electrolyte is supplied to the cathode layer 2, anode layer 3 and separator 4, via the through hole H. As a result, the cathode layer 2, anode layer 3 and separator 4 are immersed in the liquid electrolyte, respectively. Also, the electrode stacked body in the present disclosure may include one power generating unit, and may include two or more thereof.

The electrode stacked body a shown in FIG. 6 includes a plurality of power generating units ($U_1$, $U_2$, and $U_3$) stacked in the z-axis direction. As shown in FIG. 6, a plurality of power generating units may be directly connected to each other. Also, although not particularly shown in the figures, a plurality of power generating units may be connected in parallel to each other. The plurality of power generating units are independent of each other so that the liquid electrolyte does not circulate between thereof. In FIG. 6, the plurality of power generating units $U_1$ to $U_3$ are independent of each other so that the liquid electrolyte does not circulate between thereof. For example, the power generating unit $U_1$ and the power generating unit $U_2$ are comparted by the current collector 1 and the sealing member β, and are independent of each other.

One power generating unit may be constituted with two bipolar electrodes. In FIG. 6, the electrode stacked body α includes the bipolar electrode $BP_1$, and the bipolar electrode $BP_2$, in the z-axis direction. A separator 4 is placed between the adjacent bipolar electrode $BP_1$ and bipolar electrode $BP_2$. The power generating unit $U_2$ includes the cathode layer 2 in the bipolar electrode $BP_2$, the anode layer 3 in the bipolar electrode $BP_1$, and the separator 4 placed between them. Meanwhile, the power generating unit $U_1$ includes the cathode layer 2 in the bipolar electrode $BP_1$, the anode layer 3 in the anode side end portion electrode AN, and the separator 4 placed between them. Also, the power generating unit $U_3$ includes the anode layer 3 in the bipolar electrode $BP_2$, the cathode layer 2 in the cathode side end portion electrode CA, and the separator 4 placed between them.

The shape of the electrode stacked body in the present disclosure, in a plan view (the shape viewed from the z-axis direction) is not particularly limited, and examples thereof may include a quadrilateral shape such as a square shape and a rectangular shape. The length of one side of the shape of the electrode stacked body in a plan vie is, for example, 30 cm or more, may be 50 cm or more, and may be 100 cm or more. Meanwhile, the length of one side is, for example, 200 cm or less.

(2) Sealing Member

The sealing member in the present disclosure is placed along an outer periphery of the electrode stacked body viewed from the z-axis direction. The sealing member is usually placed on the side surface of the electrode stacked body. The side surface of the electrode stacked body is a surface extending in the z-axis direction in the electrode stacked body. Also, the side surface of the electrode stacked body is usually a surface facing the z-axis direction, and connecting the top surface (one main face) of the electrode stacked body and the bottom surface (the other main surface) of the electrode stacked body.

Viewed from the z-axis direction, the sealing member is preferably placed in a frame shape, along the outer periphery of the current collector in the electrode stacked body. For example, in FIG. 1A, a frame-shaped sealing member β is placed along the entire outer periphery of the current collector 1. The sealing member is preferably a resin member. Examples of the resin constituting the sealing member (referred to as third resin) may include a thermoplastic resin. Examples of the thermoplastic resin may include olefin based resins such as polyethylene and polypropylene; and polyester based resins such as polyethylene terephthalate. Among those, the third resin is preferably the olefin based resins.

(3) Nest A

In the nest A in the present disclosure, in the x-axis direction perpendicular to the z-axis direction, one end portion is placed inside the electrode stacked body and the other end portion sticks out from the sealing member. As shown in FIG. 6, in the x-axis direction, one end portion t1 of the nest A (nest $\gamma_a$) is placed inside the electrode stacked body α, and the other end portion t2 of the nest A (nest $\gamma_a$) sticks out from the sealing member β.

Viewed from the z-axis direction, the inside of the electrode stacked body α refers to the central side region of the electrode stacked body α with reference to the side surface (inner side surface $SS_1$) on the electrode stacked body α side, among the side surface of the sealing member β. Viewed from the z-axis direction, the outside of the sealing member β refers to a region opposite side to the center of the electrode stacked body α with reference to the side surface (outer side surface $SS_1$) on the opposite side to the electrode stacked body a, among the side surface of the sealing member β. Also, the extending direction of the nest A (the direction connecting one end portion t1 and the other end portion t2) is preferably parallel to the x-axis direction. Parallel means that the angle between two directions is 30° or less. The nest A is a part of a metallic mold, which is attached to the mother mold such as the first mold, and is a member for producing a resin molded product.

As shown in FIG. 6, a part of the nest A (nest $\gamma_a$) is fixed by the seal member β, and a part of the nest A (nest $\gamma_a$) is exposed from the sealing member β. Also, the sealing member β is confined by a confining portion not shown in the figure in the z-axis direction, so that the nest A (nest $\gamma_a$) is fixed and held by the sealing member β located on upper and lower side in the z-axis direction. The nest A is, for example, made of metal. The thickness of the nest A (length in the z-axis direction) is not particularly limited, and for example, it is 0.1 mm or more and 0.4 mm or less. Also, the shape of the nest A in a plan view (the shape viewed from the z-axis direction) is not particularly limited, and examples thereof may include a quadrilateral shape such as a square shape and a rectangular shape.

(4) Stacked Member

Figure 7:
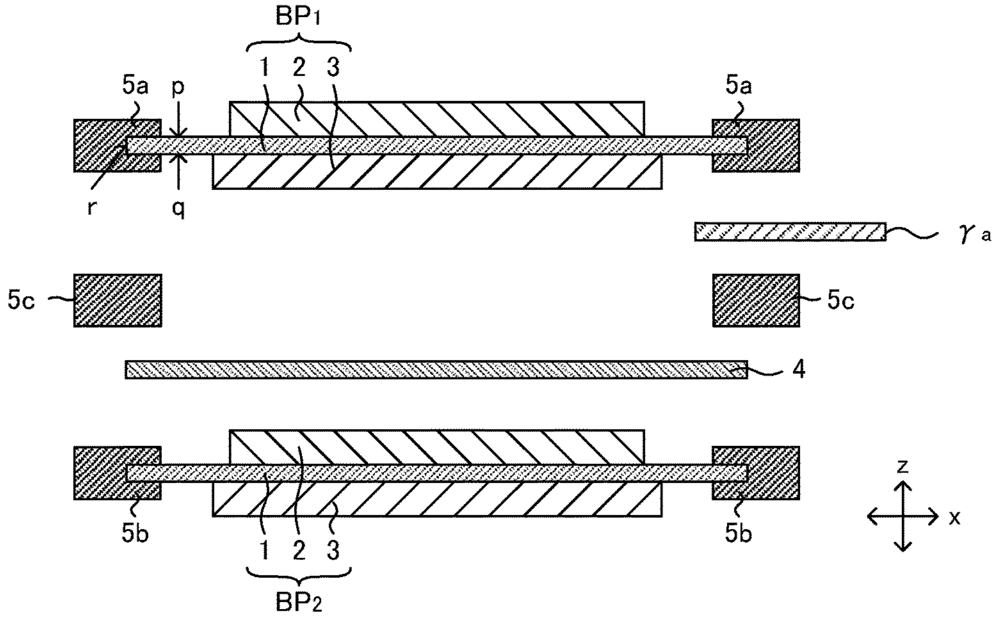
FIG. 7 is a schematic cross-sectional view illustrating an example of a method for forming a stacked member in the present disclosure.

FIG. 7 is a schematic cross-sectional view (disassembled view) illustrating an example of a method for forming a stacked member in the present disclosure. As shown in FIG. 7, the bipolar electrode $BP_1$ and the bipolar electrode $BP_2$ are prepared. The bipolar electrode $BP_1$ includes a cathode layer 2 placed on one surface of the current collector 1, and an anode layer 3 placed on the other surface of the current collector 1.

Further, the bipolar electrode $BP_1$ includes a frame member 5*a* for forming a sealing member, placed along the outer periphery of the current collector 1. Viewed from the z-axis direction, the frame member 5*a* is usually placed along the entire outer periphery of the current collector 1. For example, when the outer periphery shape of the current collector 1 is quadrilateral shape, the frame member 5*a* is placed along the entire outer periphery of the quadrilateral shape. Also, as shown in FIG. 7, the frame member 5*a* preferably covers a part of one main surface p of the current collector 1, a part of the other main surface q of the current collector 1, and the entire side surface r constituting the outer periphery of the current collector 1.

As shown in FIG. 7, the bipolar electrode BP 2 includes a cathode layer 2 placed on one surface of the current collector 1, and an anode layer 3 placed on the other surface of the current collector 1. Further, the bipolar electrode $BP_2$ includes a frame member 5*b* for forming a sealing member, placed along the outer periphery of the current collector 1. The details of the bipolar electrode $BP_2$ are similar to those of the bipolar electrode $BP_1$ described above.

As shown in FIG. 7, the anode 3 in the bipolar electrode $BP_1$ and the cathode layer 2 in the bipolar electrode BP 2 are faced to each other via the separator 4. In doing so, at least a part of the outer periphery of the separator 4 is placed between the frame member 5*a* and frame member 5*b*. Also, as shown in FIG. 7, the nest A (nest $\gamma_a$) and frame member (spacer) 5*c* are placed between the frame member 5*a* in the bipolar electrode $BP_1$ and the frame member 5*b* in the bipolar electrode $BP_2$. Then, although not shown in the figures, similar to FIG. 6, a cathode side end portion electrode CA and an anode side end portion electrode AN are also stacked. After that, a plurality of stacked frame members are welded together to form a sealing member. In this way, a stacked member is obtained.

2. First Placing Step

The first placing step of in the present disclosure is a step of inserting the nest A sticking out from the sealing member in the stacked member, into a first concave portion in a first mold.

As shown in FIG. 2B, the nest A (nest $\gamma_a$) sticking out from the sealing member β in the stacked member 10, is inserted into a first concave portion 21 in the first mold 20. In doing so, the first mold 20 is placed around the nest A (nest $\gamma_a$), establishing a space for molding a resin portion (not shown in the figure). The first concave portion 21 in the first mold 20 is preferably a groove portion with a bottom 21*a*. This is because it is easy to form a resin portion with the desired shape. Also, as shown in FIG. 2B, the first mold 20 is placed by adjusting the position of the first concave portion 21 in the y-axis direction. The method for adjusting the position of the first concave portion 21 is not particularly limited, and examples thereof may include a method wherein the position of the first concave portion 21 is adjusted by aligning the end surface of the first mold 20 with the reference surface C (surface extending in the x-axis direction), as shown in FIG. 2B. By using a surface extending in the x-axis direction as the reference surface, the displacement in the y-axis direction may be prevented effectively.

3. First Molding Step

The first molding step in the present disclosure is a step of molding a resin portion by feeding a first resin between the nest A and the first concave portion, and obtaining a nest B including the nest A and the resin portion, after the first placing step.

The method for forming a resin portion is not particularly limited, and examples thereof may include resin molding methods such as injection molding method. Examples of the first resin constituting the resin portion may include a thermoplastic resin. Examples of the thermoplastic resin may include olefin based resins such as polyethylene and polypropylene; and polyester based resins such as polyethylene terephthalate. Among them, the first resin is preferably the polyester based resins.

The melting point $T_{M1}$ of the first resin constituting the resin portion is preferably higher than the melting point $T_{M2}$ of the second resin constituting the resin member described later. This is because the first resin may be prevented from melting during the molding of the resin member. The difference between $T_{M1}$ and $T_{M2}$ is, for example, 20° C. or more, may be 50° C. or more, and may be 100° C. or more.

The compatibility between the first resin constituting the resin portion and the second resin constituting the resin member described later is preferably low. This is because, when the compatibility between the first resin and the second resin is low, it is easier to pull out the nest B. Specifically, the first resin is preferably the polyester based resins, and the second resin is preferably the olefin based resins.

The compatibility between the first resin constituting the resin portion and the third resin constituting the sealing member described above is preferably low. This is because, when the compatibility between the first resin and the third resin is low, it is easier to pull out the nest B. Specifically, the first resin is preferably the polyester based resins, and the third resin is preferably the olefin based resins.

FIGS. 8A to 8D are schematic views illustrating an example of a nest B in the present disclosure. Specifically, they are schematic views wherein the center of nest B in the z-axis direction is cut in the x-y surface. As shown in FIGS. 8A to 8D, when viewed from the z-axis direction, the nest B (nest ye) preferably includes the resin portion $\gamma_1$ on both sides of the nest A (nest $\gamma_a$) in the y-axis direction. In other words, in the y-axis direction, it is preferable that the resin portions $\gamma_1$ are placed so as to sandwich the nest A (nest $\gamma_a$).

Figure 8A:
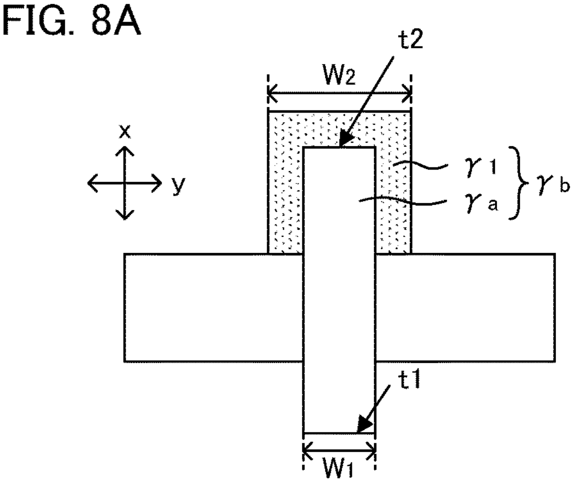
FIGS. 8A to 8D are schematic views illustrating an example of a nest B in the present disclosure.

As shown in FIG. 8A, the width (length in the y-axis direction) of nest A (nest $\gamma_a$) is regarded as $W_1$ and the width of nest B (nest $\gamma_b$) is regarded as $W_2$. The ratio of $W_2$ with respect to $W_1$ ($W_2/W_1$) is, for example, 1.1 or more, and may be 1.5 or more. Meanwhile, $W_2/W_1$ is, for example, 3.0 or less.

Figure 8C:
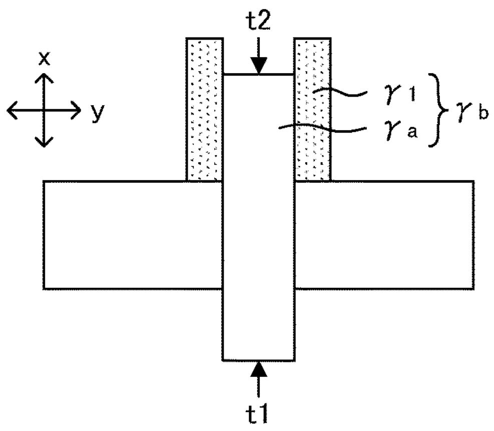
Figure 8B:
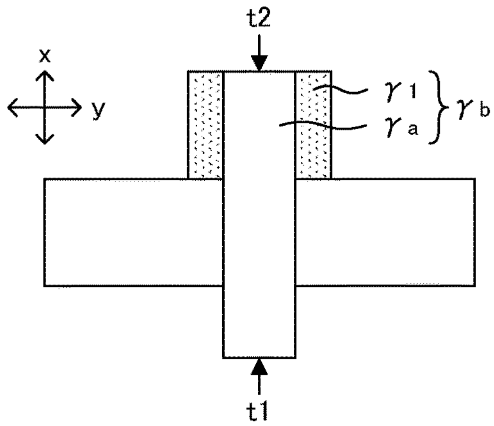
Figure 8D:
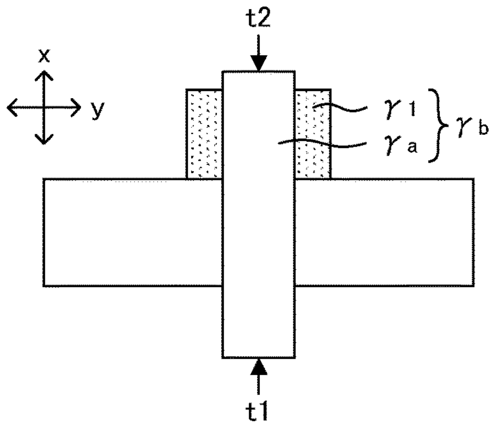

As shown in FIG. 8A, the resin portion $\gamma_1$ may be placed so as to cover the other end portion t2 of the nest A (nest $\gamma_a$). Meanwhile, as shown in FIGS. 8B to 8D, the other end portion t2 of the nest A (nest $\gamma_a$) may be exposed from the resin portion $\gamma_1$. Also, as shown in FIG. 8B, in the x-axis direction, the position of the other end portion t2 may accord with the position of the end portion of the resin portion $\gamma_1$. Also, as shown in FIG. 8C, in the x-axis direction, the position of the end portion of the resin portion $\gamma_1$ may protrude from the position of the other end portion t2. Also, as shown in FIG. 8D, in the x-axis direction, the position of the other end portion t2 may protrude from the position of the end portion of the resin portion $\gamma_1$.

Figure 9A:
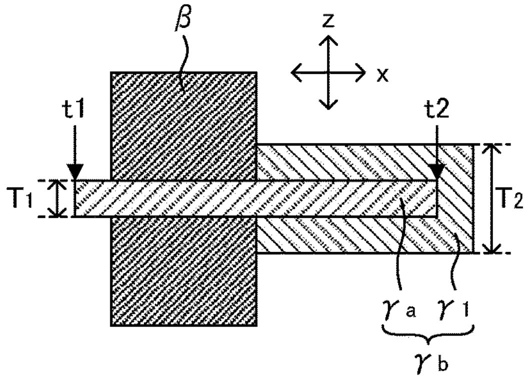
FIGS. 9A to 9C are schematic views illustrating an example of a nest B in the present disclosure.
Figure 9B:
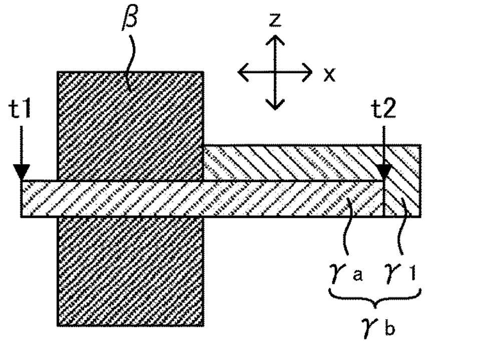
Figure 9C:
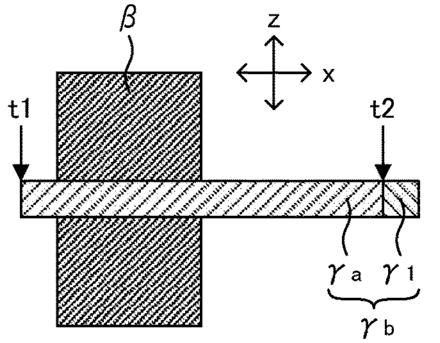

FIGS. 9A to 9C are schematic views illustrating an example of a nest B in the present disclosure. Specifically, they are schematic views wherein the center of nest B in the y-axis direction is cut in the x-z surface. As shown in FIG. 9A, when viewed from the y-axis direction, the nest B (nest $\gamma_b$) may include the resin portion $\gamma_1$ on both sides of the nest A (nest $\gamma_a$) in the z-axis direction. In other words, the resin portion $\gamma_1$ may be placed on both surfaces (both surfaces whose normal line direction is the z-axis direction) of the nest A (nest $\gamma_a$). Also, as shown in FIG. 9B, when viewed from the y-axis direction, the nest B (nest $\gamma_b$) may include the resin portion $\gamma_1$ on one side of the nest A (nest $\gamma_a$) in the z-axis direction. In other words, the resin portion $\gamma_1$ may be placed only on one surface (one surface whose normal line direction is the z-axis direction) of the nest A (nest $\gamma_a$). Also, as shown in FIG. 9C, the resin portion $\gamma_1$ may not be placed on the surface whose normal line direction is the z-axis direction.

As shown in FIG. 9A, the thickness (length in the z-axis direction) of nest A (nest $\gamma_a$) is regarded as $T_1$ and the thickness of nest B (nest $\gamma_b$) is regarded as $T_2$. The ratio of $T_2$ with respect to $T_1$ ($T_2/T_1$) is, for example, 1.0 or more, and may be 1.5 or more. Meanwhile, the $T_2/T_1$ is, for example, 3.0 or less. Also, the shape of the nest B in a plan view (the shape viewed from the z-axis direction) is not particularly limited, and examples thereof may include a quadrilateral shape such as a square shape and a rectangular shape.

4. Second Placing Step

The second placing step of in the present disclosure is a step of inserting the nest B sticking out from the sealing member in the stacked member, into a second concave portion in a second mold. Also, in the present disclosure, length of the first concave portion in a y-axis direction is identical to that of the second concave portion.

"The length of the first concave portion in a y-axis direction is identical to that of the second concave portion" means that they are identical to the extent that resin leakage does not occur during molding. The difference in length between the two is, for example, 1 mm or less, may be 0.5 mm or less, and may be 0.1 mm or less. Also, even when the length of the first concave portion in a y-axis direction is identical to that of the second concave portion, it is preferable that the length of the second concave portion in the y-axis direction is slightly longer than the length of the first concave portion in the y-axis direction. The reason therefore is to prevent the interference between nest B and the second concave portion. The difference between the two may be, for example 0.005 mm or more, and may be 0.01 mm or more.

As shown in FIG. 3A, the nest B (nest $\gamma_b$) sticking out from the sealing member β in the stacked member 10, is inserted into a second concave portion 31 in the second mold 30. In doing so, the second mold 30 is placed so as to establish a space, for molding a resin member 40, between the nest B (nest $\gamma_b$) and the second mold 30. Meanwhile, by inserting the nest B (nest $\gamma_b$) into the second concave portion 31, the nest B (nest $\gamma_b$) is fixed and held by the second concave portion 31. The second concave portion 31 in the second mold 30 is a hole portion without a bottom. Meanwhile, although not specifically shown in the figure, the second concave portion 31 may be a groove portion with a bottom. Also, as shown in FIG. 3B, the second mold 30 is placed by adjusting the position of the second concave portion 31 in the y-axis direction. The method for adjusting the position of the second concave portion 31 is not particularly limited, and examples thereof may include a method wherein the position of the second concave portion 31 is adjusted by aligning the end surface of the second mold 30 with the reference surface C (surface extending in the x-axis direction), as shown in FIG. 3B. The adjustment of the position of the second concave portion 31 in the second placing step and the adjustment of the position of the first concave portion 21 in the first placing step are preferably based on the same criteria.

5. Second Molding Step

The second molding step in the present disclosure is a step of molding a resin member by feeding a second resin between the stacked member and the second mold, after the second placing step. The resin member is a member configured to seal the electrode stacked body, similar to the sealing member described above.

The method for molding a resin member is not particularly limited, and examples thereof may include resin molding methods such as injection molding. Examples of the second resin constituting the resin member may include thermoplastic resins. Examples of the thermoplastic resin may include olefin based resins such as polyethylene and polypropylene; and polyester based resins such as polyethylene terephthalate. Among them, the second resin is preferably the olefin based resins.

The compatibility between the second resin constituting the resin member and the third resin constituting the sealing member described above is preferably high. This is because, when the compatibility between the second resin and the third resin is high, the adhesiveness between the resin member and sealing member is increased. Specifically, the second resin and the third resin are preferably the olefin based resins.

The resin member is placed along the outer periphery of the stacked member. The resin member may be placed along at least a part of the outer periphery of the stacked member, and may be placed along the entire outer periphery of the stacked member. Also, the resin member may have a partition wall structure that comparts each nest B, on the side surface (the side surface opposite side to the sealing member side surface).

6. Other Steps

Figure 1H:
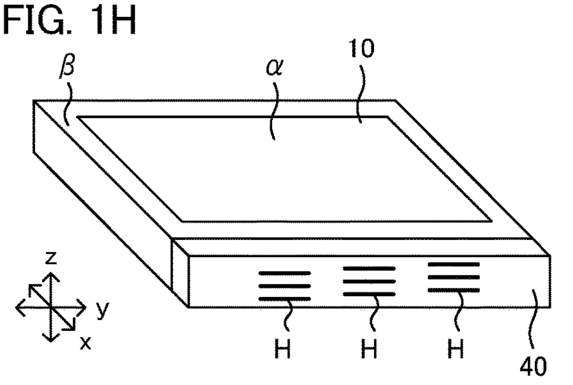

The method for producing a power storage device in the present disclosure may include a through hole forming step of forming a first through hole passing through the sealing member and a second through hole passing through the resin member, by pulling the nest B out from the stacked member and the resin member. Specifically, as shown in FIG. 1H, after the second molding step, the nest B (nest $\gamma_b$) is pulled out from the stacked member 10 and resin member 40. Thereby, as shown in FIGS. 10A to 10B and FIGS. 11A to 11B, a through hole H including a first through hole $H_1$ passing through the sealing member β, and a second through hole $H_2$ communicated with the first through hole $H_1$ and passing through the resin member 40, is formed.

Figure 10A:
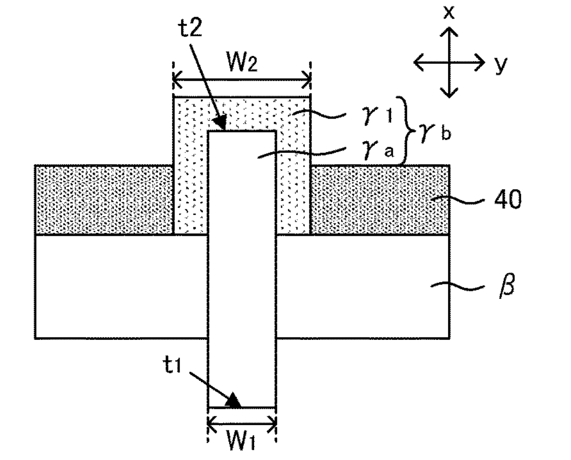
FIGS. 10A to 10B are schematic views illustrating an example of a nest B and a through hole in the present disclosure.
Figure 10B:
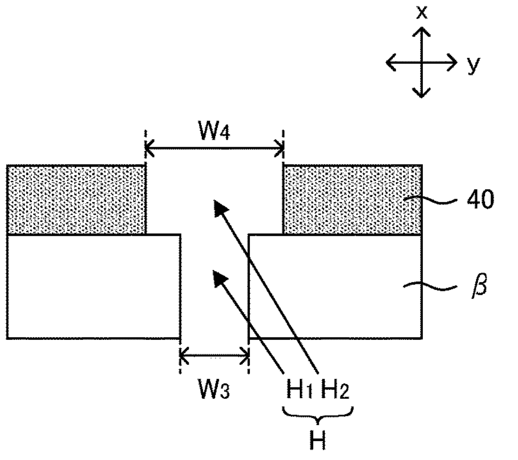

As shown in FIGS. 10A to 10B, the width $W_1$ of the nest A (nest $\gamma_a$) and the width $W_3$ of the first through hole $H_1$ are preferably the same. Similarly, the width $W_2$ of the nest B (nest $\gamma_b$) and the width $W_4$ of the second through hole $H_2$ are preferably the same. The preferable range for the ratio of $W_4$ with respect to $W_3$ ($W_4/W_3$) is similar to $W_2/W_1$ described above.

Figure 11A:
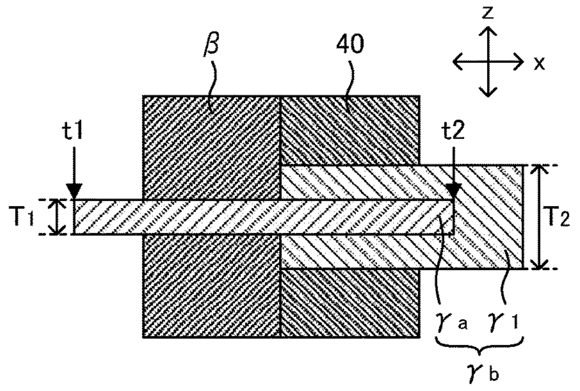
FIGS. 11A to 11B are schematic views illustrating an example of a nest B and a through hole in the present disclosure.
Figure 11B:
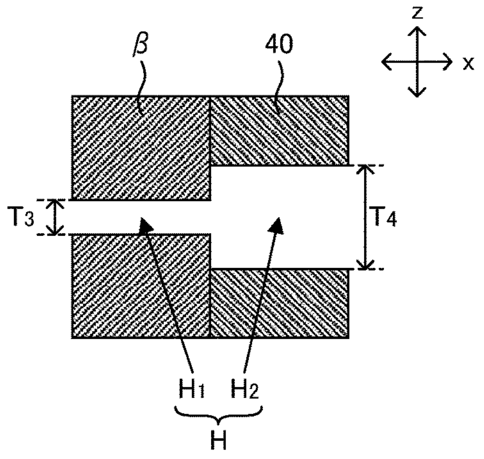

As shown in FIGS. 11A to 11B, the thickness $T_1$ of the nest A (nest $\gamma_a$) and the length $T_3$ of the first through hole $H_1$ in the z-axis direction are preferably the same. Similarly, the thickness $T_2$ of the nest B (nest $\gamma_b$) and the length $T_4$ of the second through hole $H_2$ in the z-axis direction are preferably the same. The preferable range for the ratio of $T_4$ with respect to $T_3$ ($T_4/T_3$) is similar to $T_2/T_1$ described above.

Also, in the through hole forming step, when the nest B is pulled out, the first resin constituting the resin portion of the nest B remains, as a residual component, on the inner wall portion in the second through hole, due to friction. That is, after pulling the nest B out, there may be residual component of the first resin on the inner wall portion in the second through hole. Also, as described above, the melting point of the first resin is preferably higher than the second resin constituting the resin member. Also, the residual component of the first resin may be present on the inner wall portion in the second through hole, and the residual component may not be present on the inner wall portion in the first through hole.

After the through hole forming step described above, the method for producing a power storage device in the present disclosure may include a liquid electrolyte supplying step of supplying liquid electrolyte into the electrode stacked body, via the through hole. A method for supplying liquid electrolyte is not particularly limited, and known methods may be used.

After the liquid electrolyte supplying step described above, the method for producing a power storage device in the present disclosure may include a sealing step of sealing the through hole. A method for sealing the through hole is not particularly limited, and examples thereof may include a method wherein a film is used for the sealing. Also, power storage device obtained by each step described above is explained in "B. Power storage device" later.

B. Power Storage Device

Figure 12:
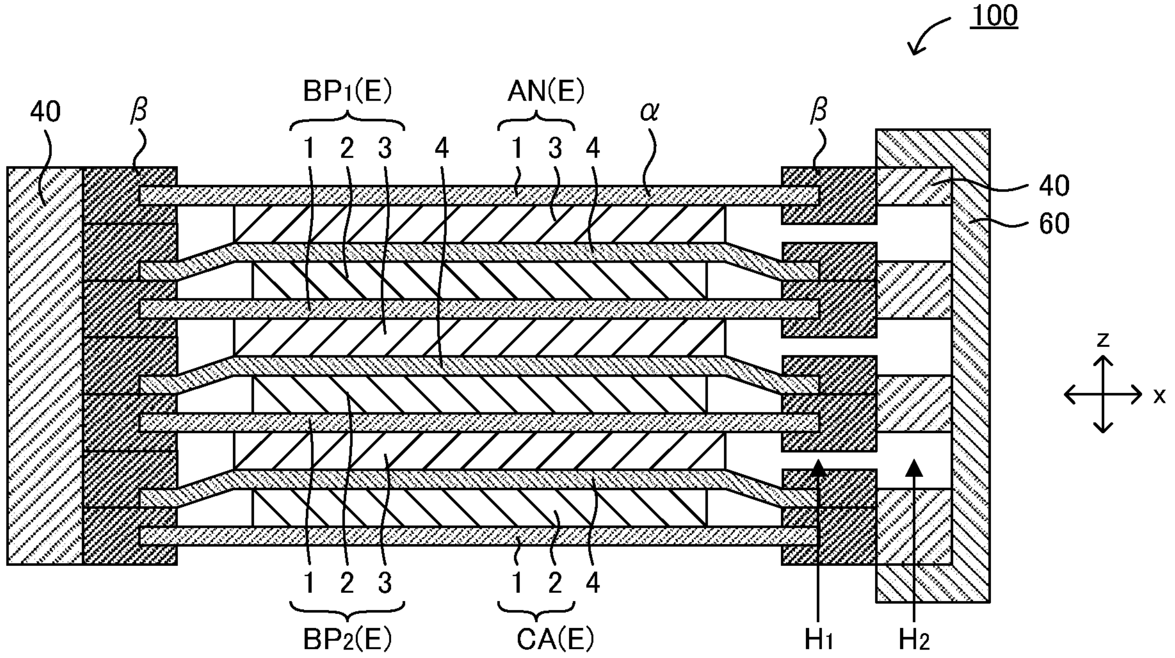
FIG. 12 is a schematic cross-sectional view illustrating an example of a power storage device in the present disclosure.

FIG. 12 is a schematic cross-sectional view illustrating an example of a power storage device in the present disclosure. A power storage device 100 shown in FIG. 12 comprises: an electrode stacked body α including a plurality of electrodes stacked in a z-axis direction; a sealing member β placed along an outer periphery of the electrode stacked body α viewed from the z-axis direction; and a resin member 40 placed along an outer periphery of the sealing member viewed from the z-axis direction. In the x-axis direction, the power storage device 100 comprises a first through hole $H_1$ passing through the sealing member β, and a second through hole $H_2$ communicated with the first through hole $H_1$ and passing through the resin member 40. Also, as shown in FIG. 10B, the width $W_4$ of the second through hole $H_2$ (the length in the y-axis direction) is longer than the width $W_3$ of the first though hole $H_1$ (the length in the y-axis direction).

Each member constituting the power storage device in the present disclosure is similar to the contents described in "A. Method for producing power storage device" above. Also, the power storage device in the present disclosure preferably includes liquid electrolyte in the electrode stacked body. Also, as shown in FIG. 12, the second through hole $H_2$ may be sealed by a film 60 placed on the side surface of the resin member 40 (the side surface opposite to the sealing member β side surface).

Specific examples of the power storage device in the present disclosure may include a secondary battery (such as a lithium ion secondary battery) and an electric double layer capacitor. Also, examples of the use application of the power storage device may include a power supply of a vehicle such as a hybrid electric vehicle (HEV), a plug-in hybrid electric vehicle (PHEV), a battery electric vehicle (BEV), a gasoline-powered vehicle, and a diesel-powered vehicle. In particular, it is preferably used in the driving power supply of a hybrid electric vehicle (HEV), a plug-in hybrid electric vehicle (PHEV), or a battery electric vehicle (BEV). Also, the power storage device in the present disclosure may be used as a power source for moving objects other than vehicles (such as railroad vehicles, ships, and airplanes), and may be used as a power source for electric appliances such as information processing apparatuses.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

REFERENCE SIGNS LIST

1 . . . current collector
2 . . . cathode layer
3 . . . anode layer
4 . . . separator
5 . . . frame member
10 . . . stacked member
20 . . . first mold
30 . . . second mold
40 . . . resin member
100 . . . power storage device

The invention claimed is:

1. A method for producing a power storage device, the method comprising:

a preparing step of preparing a stacked member including an electrode stacked body including a plurality of electrodes stacked in a z-axis direction, a sealing member placed along an outer periphery of the electrode stacked body viewed from the z-axis direction, and a nest A wherein, in an x-axis direction perpendicular to the z-axis direction, one end portion is placed inside the electrode stacked body and the other end portion sticks out from the sealing member;

a first placing step of inserting the nest A sticking out from the sealing member in the stacked member, into a first concave portion in a first mold, wherein, in the first placing step, the first concave portion in the first mold is a groove portion with a bottom, and the other end portion of the nest A is positioned within the groove portion;

after the first placing step, a first molding step of molding a resin portion by feeding a first resin between the nest A and the first concave portion, and obtaining a nest B including the nest A and the resin portion;

after the first molding step, a second placing step of inserting the nest B sticking out from the sealing member in the stacked member, into a second concave portion in a second mold; and after the second placing step, a second molding step of molding a resin member by feeding a second resin between the stacked member and the second mold, wherein a length of the first concave portion in a y-axis direction perpendicular to the z-axis direction and the x-axis direction is identical to that of the second concave portion.

2. The method for producing a power storage device according to claim 1, wherein, viewed from the z-axis direction, the nest B includes the resin portion on both sides of the nest A in the y-axis direction.

3. The method for producing a power storage device according to claim 1, wherein, viewed from the y-axis direction, the nest B includes the resin portion on both sides of the nest A in the z-axis direction.

4. The method for producing a power storage device according to claim 1, wherein a melting point of the first resin is higher than a melting point of the second resin.

5. The method for producing a power storage device according to claim 1, wherein the sealing member is a resin member including a third resin, wherein the third resin and the second resin are olefin based resin, and wherein the first resin is polyester based resin.

6. The method for producing a power storage device according to claim 1, further comprising, after the second molding step, a through hole forming step of forming a first through hole passing through the sealing member and a second through hole passing through the resin member, by pulling the nest B out from the stacked member and the resin member.

7. The method for producing a power storage device according to claim 1, wherein, in the first placing step, there is a space between the nest A and a side surface of the groove portion.

8. The method for producing a power storage device according to claim 7, wherein, in the first placing step, there is a space between the nest A and the bottom of the groove portion, and wherein, in the first molding step, the resin portion is placed so as to cover the other end portion of the nest A.

9. A power storage device comprising:

an electrode stacked body including a plurality of electrodes stacked in a z-axis direction;

a sealing member placed along an outer periphery of the electrode stacked body viewed from the z-axis direction; and a resin member placed along an outer periphery of the sealing member viewed from the z-axis direction, wherein, in an x-axis direction perpendicular to the z-axis direction, the power storage device comprises a first through hole passing through the sealing member, and a second through hole communicating with the first through hole and passing through the resin member, wherein, when a direction perpendicular to the x-axis direction and the z-axis direction is regarded as a y-axis direction, a length of the second through hole in the y-axis direction is longer than a length of the first through hole in the y-axis direction, wherein the resin member through which the second through hole passes is placed along an entire outer periphery of the sealing member, and wherein the second through hole is sealed by a film placed on a side surface of the resin member.

10. The power storage device according to claim 9, wherein a length of the second through hole in the z-axis direction is longer than a length of the first through hole in the z-axis direction.

11. The power storage device according to claim 9, wherein a residual component of a first resin, having a melting point higher than a second resin included in the resin member, exists in an inner wall portion in the second through hole.

* * * * *